(12) United States Patent
Choi et al.

(10) Patent No.: US 11,327,612 B2
(45) Date of Patent: May 10, 2022

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Gyeonggi-do (KR); Jong Min Kim, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 120 days.

(21) Appl. No.: 16/058,616

(22) Filed: Aug. 8, 2018

(65) Prior Publication Data
US 2019/0056821 A1 Feb. 21, 2019

(30) Foreign Application Priority Data
Aug. 18, 2017 (KR) .................. 10-2017-0104665

(51) Int. Cl.
*G06F 3/045* (2006.01)
*G06F 3/044* (2006.01)

(52) U.S. Cl.
CPC .......... *G06F 3/0443* (2019.05); *G06F 3/0446* (2019.05); *G06F 3/0448* (2019.05); *G06F 2203/04111* (2013.01); *G06F 2203/04112* (2013.01)

(58) Field of Classification Search
CPC ........... G06F 3/044; G06F 2203/04111; G06F 2203/04112

USPC ........................................................ 345/174
See application file for complete search history.

(56) References Cited

U.S. PATENT DOCUMENTS

| | | | | |
|---|---|---|---|---|
| 2013/0201348 A1* | 8/2013 | Li | ............................ | G06F 3/044 348/174 |
| 2013/0341070 A1* | 12/2013 | Kim | ....................... | G06F 3/0446 174/250 |
| 2014/0160374 A1* | 6/2014 | Wang | ....................... | G06F 3/044 349/12 |
| 2014/0216790 A1* | 8/2014 | Trauernicht | .......... | H05K 1/0296 174/253 |
| 2017/0108964 A1* | 4/2017 | Sato | ....................... | G06F 3/0446 |
| 2018/0059837 A1* | 3/2018 | Kim | ....................... | G06F 3/0412 |

FOREIGN PATENT DOCUMENTS

| | | |
|---|---|---|
| JP | 2014-191465 A | 10/2014 |
| JP | 2015-165377 A | 9/2015 |
| KR | 10-2017-0012315 A | 2/2017 |

* cited by examiner

*Primary Examiner* — Jonathan M Blancha
(74) *Attorney, Agent, or Firm* — The PL Law Group, PLLC (57) ABSTRACT

A touch sensor includes a substrate layer, a plurality of sensing electrodes on the substrate layer, the sensing electrodes including electrode lines therein, and dummy patterns disposed between the sensing electrodes by a pattern period corresponding to that of the electrode lines included in the sensing electrodes. Electrode visibility is reduced by the dummy patterns, and optical and electrical properties of the touch sensor are also improved.

13 Claims, 6 Drawing Sheets

TOUCH SENSOR AND IMAGE DISPLAY DEVICE INCLUDING THE SAME

CROSS-REFERENCE TO RELATED APPLICATION AND CLAIM OF PRIORITY

This application claims priority to Korean Patent Application No. 10-2017-0104665 filed on Aug. 18, 2017 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including a patterned sensing electrode, and an image display device including the same.

2. Description of the Related Art

As information technologies are being developed, various demands in display devices having thinner dimension, lightweight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

As a resolution of the display device become increased to a QHD (Quad High Definition) level or a UHD (Ultra High Definition) level, a high resolution is also required in the touch sensor. Thus, a reduction of an optical interference from a sensing electrode included in the touch sensor is needed.

For example, if conductive patterns included in the sensing electrode are visible to the user, an image quality of the display device may be degraded. When structures included in a display panel of the display device overlap the conductive patterns of the sensing electrode, the image quality may be further degraded.

Thus, development of the touch sensor having improved transmittance and optical properties while also having high sensitivity is required. For example, Korean Patent Publication No. 2014-0092366 discloses an image display device combined with a touch screen panel including a touch sensor. However, demands of a touch sensor or a touch panel with high resolution and improved optical properties are still increasing.

SUMMARY

According to an aspect of the present invention, there is provided a touch sensor having improved sensitivity, resolution and optical properties.

According to an aspect of the present invention, there is provided an image display device including the touch sensor and having enhanced image quality.

The above aspects of the present inventive concepts will be achieved by the following features or constructions:

(1) A touch sensor comprising a substrate layer; a plurality of sensing electrodes on the substrate layer, the sensing electrodes including electrode lines therein; and dummy patterns disposed between the sensing electrodes by a pattern period corresponding to that of the electrode lines included in the sensing electrodes.

(2) The touch sensor according to the above (1), wherein the electrode lines extend in a wavy line or a saw-tooth line.

(3) The touch sensor according to the above (1), wherein the dummy patterns are arranged along an extension line from the wavy line or the saw-tooth line.

(4) The touch sensor according to the above (1), wherein the dummy patterns include at least one of a wedge pattern, a line pattern or a bar pattern which are cut from the electrode line.

(5) The touch sensor according to the above (1), wherein the sensing electrode further includes connecting blocks that connect neighboring ones of the electrode lines.

(6) The touch sensor according to the above (5), wherein the sensing electrode includes slits therein, and the slits are defined by the electrode lines and the connecting blocks neighboring each other.

(7) The touch sensor according to the above (5), further comprising dummy blocks that connect neighboring ones of the dummy patterns, the dummy blocks being arranged by a pattern period the same as that of the connecting blocks.

(8) The touch sensor according to the above (7), wherein the dummy blocks are combined with inflected portions of the dummy pattern.

(9) The touch sensor according to the above (7), wherein dummy slits are defined by the dummy patterns and the dummy blocks neighboring each other.

(10) The touch sensor according to the above (1), wherein dummy regions are defined between boundaries of the sensing electrodes which face each other, wherein the dummy patterns are arranged in each of the dummy regions.

(11) The touch sensor according to the above (10), wherein the boundaries of the sensing electrodes extend in a wavy shape.

(12) The touch sensor according to the above (1), wherein the sensing electrodes include: first sensing electrodes connected to each other and arranged along a first direction that is parallel to a top surface of the substrate layer; and second sensing electrodes connected to each other and arranged along a second direction that is parallel to a top surface of the substrate layer to cross the first direction, wherein the electrode lines include: first electrode lines included in the first sensing electrode; and second electrode lines included in the second sensing electrode.

(13) The touch sensor according to the above (12), wherein the first electrode lines extend in the first direction and the second electrode lines extend in the second direction.

(14) An image display device including the touch sensor according any one of the above (1) to (13).

In the touch sensor according to exemplary embodiments as described above, a sensing electrode may include a plurality of slits therein defined between electrode lines. A light scattering or a light diffraction may be induced by the slits so that a visibility of the sensing electrode may be reduced. Further, an aperture ratio of the touch sensor may be improved by the slits to achieve a high transmittance structure.

In exemplary embodiments, dummy patterns having a shape substantially the same as or similar to that of the electrode lines may be arranged in a dummy region defined between the sensing electrodes. Thus, a regional difference of optical properties may be reduced so that the sensing electrode may be prevented from being viewed. A dummy slit may be formed between the dummy patterns, and thus optical properties may be further enhanced.

The dummy patterns corresponding to the electrode lines may be arranged in the dummy region so that a linearity and regularity of capacitance formation may be enhanced to improve sensitivity and resolution of the touch sensor.

DETAILED DESCRIPTION

According to exemplary embodiments of the present invention, there is provided a touch sensor which may comprise a plurality of sensing electrodes including electrode lines therein, and dummy patterns arranged between the sensing electrodes to have a pattern period corresponding to the electrode lines. An image display device including the touch sensor is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
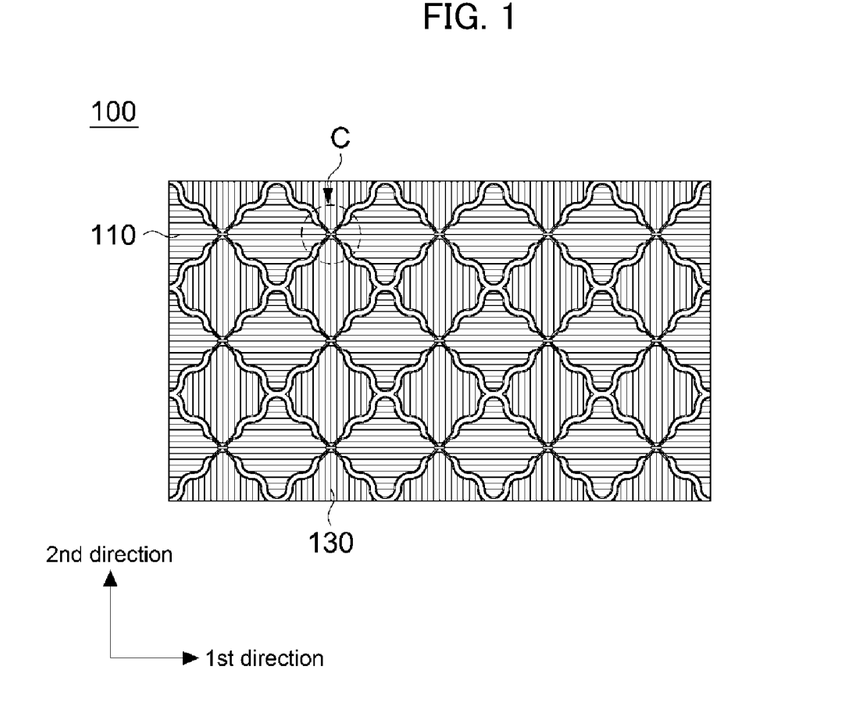
FIG. 1 is a schematic top plane view illustrating a touch sensor in accordance with exemplary embodiments.
Figure 2:
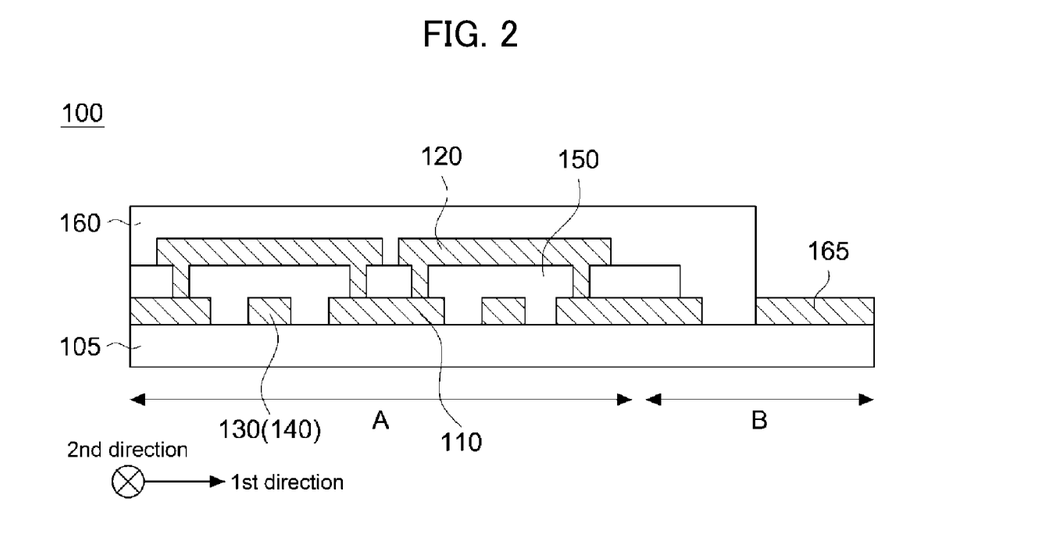
FIG. 2 is a schematic cross-sectional view illustrating a touch sensor in accordance with exemplary embodiments.

FIG. 1 is a schematic top plane view illustrating a touch sensor in accordance with exemplary embodiments. FIG. 2 is a schematic cross-sectional view illustrating a touch sensor in accordance with exemplary embodiments For example, FIG. 2 includes a partial cross-sectional view of a region designated as "C" in FIG. 1.

Referring to FIGS. 1 and 2, a touch sensor may include a substrate layer 105 and sensing electrodes 110 and 130 arranged on the substrate layer 105.

The substrate layer 100 may include a film-type substrate that may serve as a base layer for forming the sensing electrodes 110 and 130, or an object or a workpiece on which the sensing electrodes 110 and 130 are formed. In some embodiments, the substrate layer 105 may include a display panel on which the sensing electrodes 110 and 130 may be directly formed.

For example, the substrate layer 105 may include a substrate or a film material commonly used in the touch sensor, e.g., glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate, polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

The sensing electrodes 110 and 130 may include first sensing electrodes 110 and second sensing electrodes 130.

The first sensing electrodes 110 may be arranged along a first direction (e.g., an X-axis direction) that may be parallel to a top surface of the substrate layer 105. In some embodiments, the first sensing electrodes 110 may include island-type unit electrodes physically separated from each other. In this case, the first sensing electrodes 110 neighboring in the first direction may be electrically connected to each other by a bridge electrode 120.

Accordingly, a first sensing electrode row extending in the first direction may be formed by a plurality of the first sensing electrodes 110. Further, a plurality of the first sensing electrode rows may be arranged along a second direction that may be parallel to the top surface of the substrate layer 105. The first and second directions may cross each other, e.g., to be perpendicular to each other.

The second sensing electrodes 130 may be arranged along the second direction (e.g., a Y-axis direction). Accordingly, a second sensing electrode column extending in the second direction may be formed by the second sensing electrodes 130. Further, a plurality of the second sensing electrode columns may be arranged along the first direction.

In some embodiments, the second sensing electrodes 130 neighboring in the second direction may be physically and electrically connected by a connecting portion 140. For example, the connecting portion 140 may be integrally formed with the second sensing electrodes 130 at the same level.

The sensing electrodes 110 and 130, and/or the bridge electrode 120 may include a metal, an alloy, a metal wire or a transparent conductive oxide.

For example, the sensing electrodes 110 and 130, and/or the bridge electrode 120 may include silver (Ag), gold (Au), copper (Cu), aluminum (Al), platinum (Pt), palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), or an alloy thereof (e.g., silver-palladium-copper (APC)). These may be used alone or in a combination thereof.

The sensing electrodes 110 and 130, and/or the bridge electrode 120 may include the transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the sensing electrodes 110 and 130, and/or the bridge electrode 120 may include a stack structure including the transparent conductive oxide and the metal. For example, the sensing electrodes 110 and 130, and/or the bridge electrode 120 may have a triple-layered structure including a transparent conductive oxide layer-a metal layer-a transparent conductive oxide layer. In this case, a flexible property may be enhanced by the metal layer, and a resistance may be reduced to increase a signal transfer speed. Further, an anti-corrosion property and a transmittance may be improved by the transparent conductive oxide layer.

As illustrated in FIG. 2, an insulation layer 150 may be formed on the substrate layer 105 to at least partially cover the sensing electrodes 110 and 130. In exemplary embodiments, the insulation layer 150 may be formed at an intersection area of the first sensing electrode 110 and the second sensing electrode 130 to cover the connecting portion 140 of the second sensing electrode 130. The bridge electrode 120 may be formed on the insulation layer 150 to be connected to the first sensing electrodes 110 neighboring each other.

The insulation layer 150 may include an inorganic insulation material such as silicon oxide, silicon nitride, etc., or an organic insulation material such as acryl-based resin, a siloxane-based resin, etc.

As illustrated in FIG. 2, the touch sensor 100 may include a sensing region A and a wiring region B. The sensing electrodes 110 and 130, and the bridge electrode 120 may be disposed on the substrate layer 105 of the sensing region A. A pad 165 may be disposed on the substrate layer 105 of the wiring region B.

In exemplary embodiments, a trace may extend from each of the first sensing electrode row and the second sensing electrode column to be electrically connected to the pad 165 in the wiring region B.

Accordingly, a physical touch information introduced to the touch sensor 100 may be converted into an electrical signal generated from a capacitance difference by the first sensing electrode 110 and the second sensing electrode 130. The electrical signal may be transferred to a driving IC through the pad 165 so that a touch sensing may be implemented. The driving IC may be coupled to the pad 165 via, e.g., a flexible printed circuit board (FPCB).

A passivation layer 160 may protect the sensing electrodes 110 and 130, and the bridge electrode 120 on the sensing region A, and may also extend to the wiring region B. The passivation layer 160 may include an opening through which the pad 165 may be exposed.

The passivation layer 160 may include an inorganic insulation material such as silicon oxide, silicon nitride, etc., or an organic insulation material such as acryl-based resin, a siloxane-based resin, etc.

As illustrated in FIG. 1, the first sensing electrode 110 and the second sensing electrode 130 may be patterned into a predetermined shape.

In exemplary embodiments, 1, the first sensing electrode 110 and the second sensing electrode 130 may be patterned to have a boundary or periphery of a wavy shape.

Accordingly, a moire phenomenon which may occur when the sensing electrodes 110 and 130, and electrodes or wirings (e.g., a data line, a gate line, etc.) in a display panel disposed under the touch sensor 100 overlap each other may be avoided or reduced.

Figure 3:
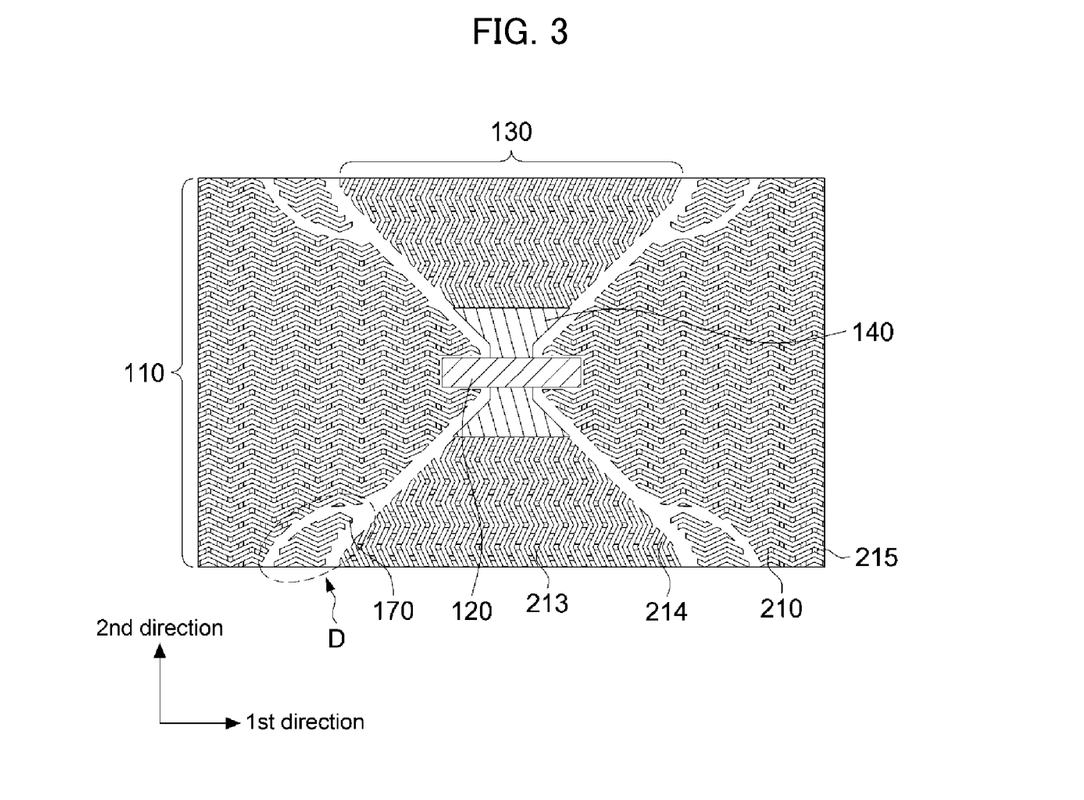
FIGS. 3 and 4 are schematic top plane views illustrating a construction of a sensing electrode and a dummy pattern in accordance with exemplary embodiments.
Figure 4:
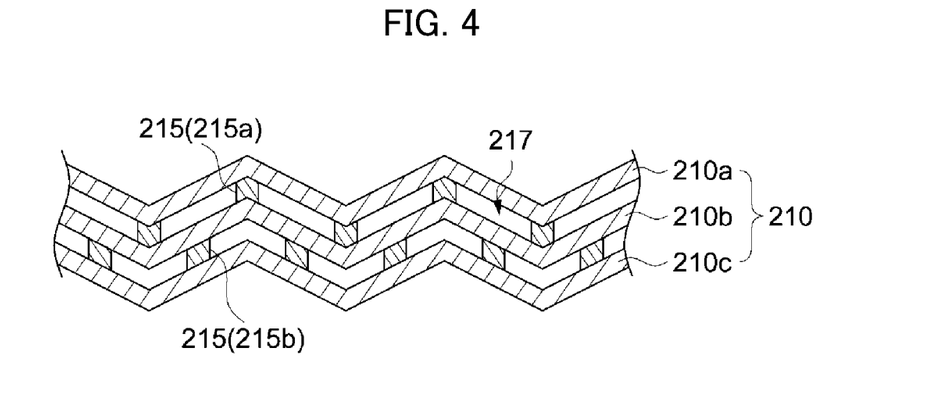

FIGS. 3 and 4 are schematic top plane views illustrating a construction of a sensing electrode and a dummy pattern in accordance with exemplary embodiments.

For example, FIG. 3 is an enlarged top plane view of a region designated as "C" in FIG. 1, and FIG. 4 is a schematic view illustrating a pattern construction in the sensing electrode.

Referring to FIGS. 3 and 4, electrode lines and connecting blocks may be formed in each sensing electrode 110 and 130.

As illustrated in FIG. 4, electrode lines 210 extending in a substantially saw-tooth shape may be formed in each sensing electrode 110 and 130. Connecting blocks 215 may be arranged between the electrode lines 210 (e.g., 210a, 210b, 210c . . . ) to connect the electrode lines 210 to form slits 217.

In some embodiments, the connecting blocks 215 may be provided at each bent portion or inflected portion of the electrode line 210.

For example, some of the connecting blocks 215 (e.g., connecting blocks 215a) may be combined with the inflected portion or the bent portion of the electrode line 210. Some of the connecting blocks 215 (e.g., connecting blocks 215b) may be combined with an extension portion between the neighboring inflected portions.

Referring to FIG. 3 again, as described with reference to FIG. 4, the first sensing electrode 110 may include first electrode lines 210 and first connecting blocks 215, and the second sensing electrode 130 may include second electrode lines 214 and second connecting blocks 213.

The first electrode line 210 may have a saw-tooth shape or a zigzag shape extending in the first direction, and the second electrode line 214 may have a saw-tooth shape or a zigzag shape extending in the second direction.

According to exemplary embodiments, an extension direction of the first electrode line 210 may be substantially the same as a direction in which the first sensing electrodes 110 are arranged (e.g., the first direction), and an extension direction of the second electrode line 214 may be substantially the same as a direction in which the second sensing electrodes 130 are arranged (e.g., the second direction). Thus, a signal flow or a current flow through the sensing electrodes 110 and 130 may be facilitated to improve a signal transfer speed.

As described above, the slits may be defined in each sensing electrode 110 and 130 by the connecting blocks 213 and 214.

The sensing electrodes 110 and 130 may include the slits 217 therein so that a transmittance and an aperture ratio of the touch sensor may be increased. A light scattering may be also induced by the slits 217 so that electrode patterns may be prevented from being viewed.

Additionally, the electrode lines 210 and 214 included in the sensing electrodes 110 and 130 may be formed in a non-linear shape, e.g., a saw-tooth shape so that the light-scattering effect may be further improved and an overlap with the display panel under the touch sensor may be reduced to prevent the moire phenomenon.

A dummy region D may be defined between boundaries of the first sensing electrode 110 and the second sensing electrode 130. Dummy patterns 170 may be arranged in each dummy region D to be spaced apart from the first sensing electrode 110 and the second sensing electrode 130.

In exemplary embodiments, the dummy patterns 170 may be arranged by a pattern period corresponding to that of the electrode line 210 and 214 included in the sensing electrodes 110 and 130. For example, the dummy pattern 170 may be arranged along an imaginary profile or an imaginary extension line from the first electrode line 210 that may extend in the saw-tooth shape.

For example, the dummy pattern 170 may include a bar pattern, a line pattern and/or a wedge pattern which may be cut from the first electrode line 210 along the imaginary extension line. The wedge pattern may include an inflected portion or a bent portion having a shape substantially the same as that included in the first electrode line 210. A dummy slit may be also defined between the neighboring dummy patterns 170.

As described above, the dummy patterns 170 having a construction substantially the same as that of the electrode lines 210 and 214 included in the sensing electrodes 110 and 130 may be arranged in the dummy region D. Thus, a regional electrode arrangement deviation in the dummy region D may be reduced so that electrode patterns in the touch sensor may be prevented from being viewed. Further, the dummy pattern 170 may be also formed in, e.g., the saw-tooth shape so that the moire phenomenon due to the overlap with the display panel may be suppressed.

The dummy pattern 170 may be provided in each dummy region D to suppress an excessive increase of capacitance formed between the sensing electrodes 110 and 130 so that an operational speed of the touch sensor may be improved. Regularity and linearity of capacitance may be also maintained by the dummy pattern 170 so that a signal transfer reliability may be enhanced.

The dummy pattern may be formed of a conductive material substantially the same as or similar to that of the sensing electrode 110 and 130 or the electrode line 210 and 214.

In some embodiments, the bridge electrode 120 and/or the connecting portion 140 may have a solid structure that may not include slits therein. Accordingly, Thus, a current path at the connecting portion 140 and the bridge electrode 120 having relatively small widths may be additionally achieved.

In some embodiments, the bridge electrode 120 and/or the connecting portion 140 may also include slits therein. In this case, the transmittance and the aperture ratio of the touch sensor may be further enhanced.

Figure 5:
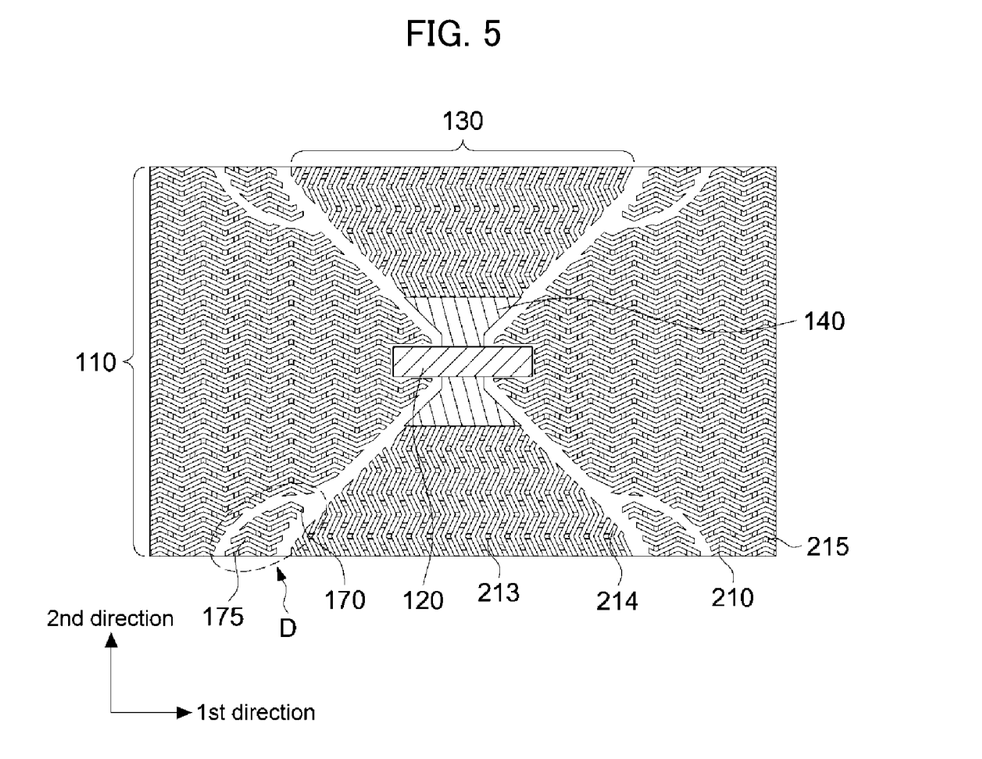
FIGS. 5 and 6 are schematic top plane views illustrating a construction of a sensing electrode and a dummy pattern in accordance with exemplary embodiments.
Figure 6:
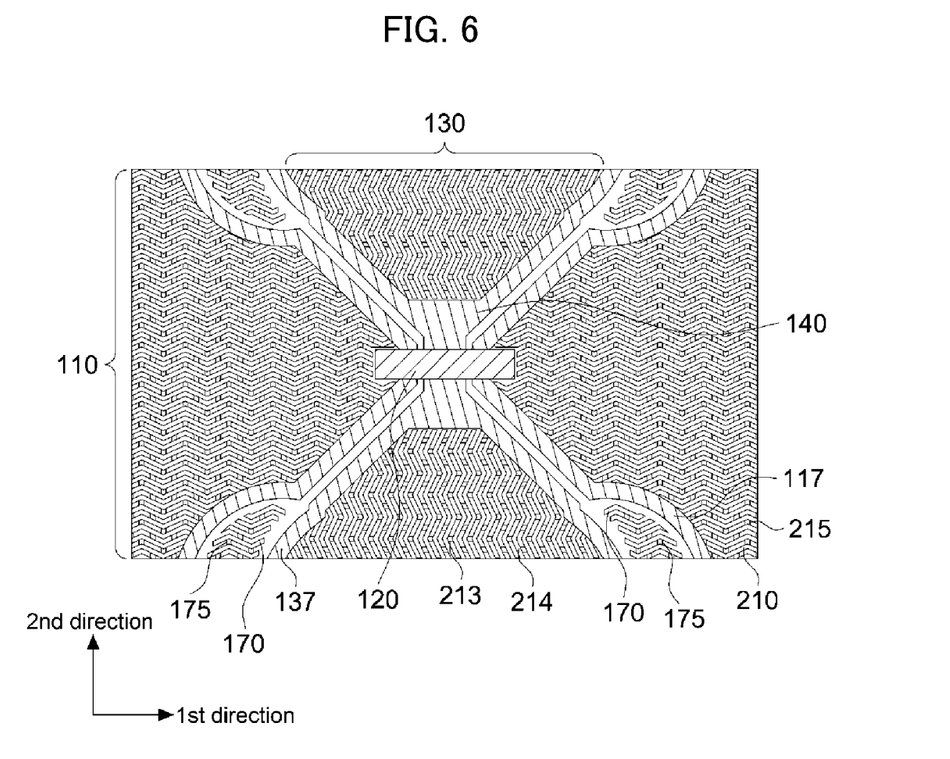

FIGS. 5 and 6 are schematic top plane views illustrating a construction of a sensing electrode and a dummy pattern in accordance with exemplary embodiments;

Referring to FIG. 5, dummy blocks 175 connecting the neighboring dummy patterns 170 may be formed in the dummy region D. In exemplary embodiments, the dummy blocks 175 may be arranged by a pattern period substantially the same as or similar to that of the connecting blocks 213 and 215 included in the sensing electrodes 110 and 130.

In some embodiments, the dummy blocks 175 may be combined with inflected portions or bent portions of the dummy pattern 170 having a wedge pattern shape.

The dummy blocks 175 may be included in the dummy region D so that a pattern similarity to the sensing electrodes 110 and 130 may be further enhanced. Thus, electrode visibility in the touch sensor may be further reduced. A linearity of capacitance formed between the sensing electrodes 110 and 130 may be also enhanced so that regularity and sensitivity of the signal transfer may be further improved.

The dummy slits between the dummy patterns 170 may be additionally divided by the dummy blocks. Accordingly, the light scattering or the light diffraction may be further facilitated by the dummy slits.

Referring to FIG. 6, boundary patterns confining the sensing electrodes 110 and 130 may be further formed. For example, a first boundary pattern 117 surrounding the first sensing electrode 110 and a second boundary pattern 137 surrounding the second sensing electrode 130 may be formed.

In this case, the dummy region D may be defined between the first boundary pattern 117 and the second boundary pattern 137 facing each other.

The electrode lines 210 and 214 in the sensing electrodes 110 and 130 may be merged by the boundary patterns 117 and 137, and thus a channel resistance through the sensing electrodes 110 and 130 may be reduced.

Figure 7:
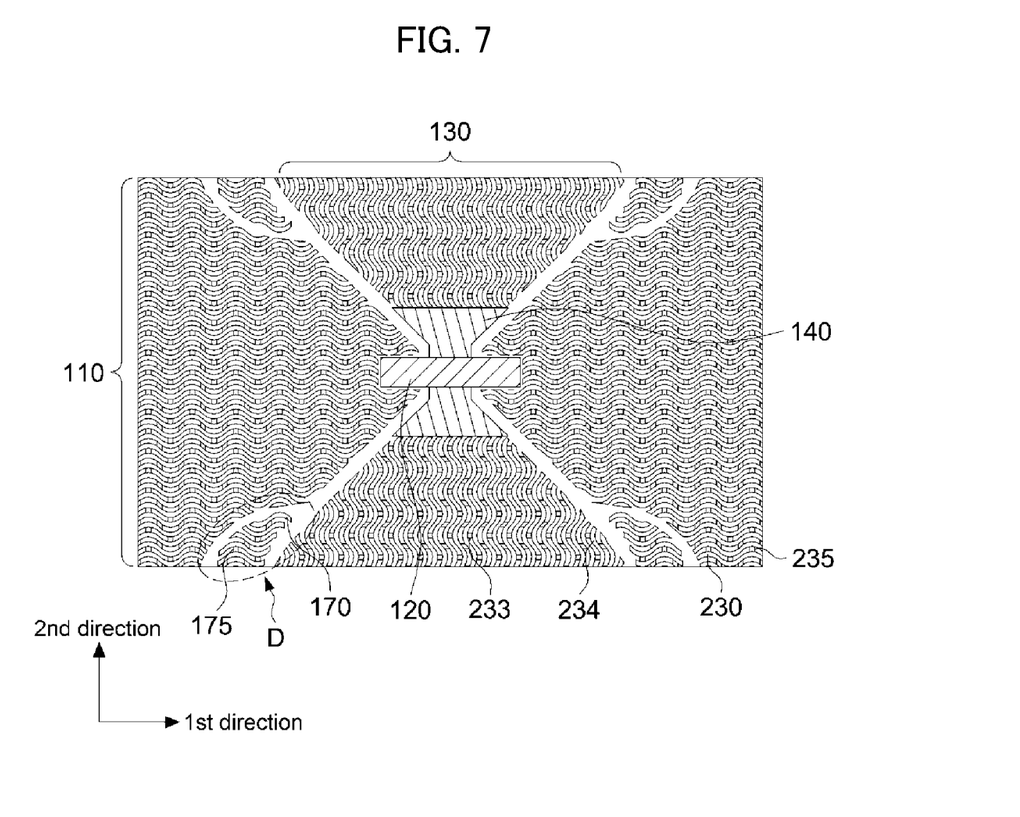
FIG. 7 is a schematic top plane view illustrating a construction of a sensing electrode and a dummy pattern in accordance with exemplary embodiments.

FIG. 7 is a schematic top plane view illustrating a construction of a sensing electrode and a dummy pattern in accordance with exemplary embodiments.

Referring to FIG. 7, electrode lines 230 and 234 in the sensing electrodes 110 and 130 may extend in a substantially wavy shape.

For example, a first electrode line 230 in the first sensing electrode 110 may have a wavy shape extending in the first direction. The first electrode lines 230 neighboring each other may be connected by a first connecting block 235, and a slit having a wavy shape may be defined.

A second electrode line 234 in the second sensing electrode 130 may have a wavy shape extending in the second direction. The second electrode lines 234 neighboring each other may be connected by a second connecting block 233, and a slit having a wavy shape may be defined.

In some embodiments, as illustrated in FIG. 6, a boundary pattern confining each sensing electrodes 110 and 130 and merging the electrode lines 230 and 234 having the wavy shape may be further formed.

As described above, dummy patterns 170 in the dummy region D may have a pattern period corresponding to that of the electrode lines 230 and 234, and may be arranged according to a profile of the electrode lines 230 and 234. For example, the dummy pattern 170 may have a curved pattern shape cut from the first electrode line 230.

As illustrated in FIG. 7, the dummy pattern 170 may have a cut pattern shape from the first electrode line 230. In some embodiments, dummy blocks 175 connecting the neighboring dummy patterns 170 may be formed.

Figure 8:
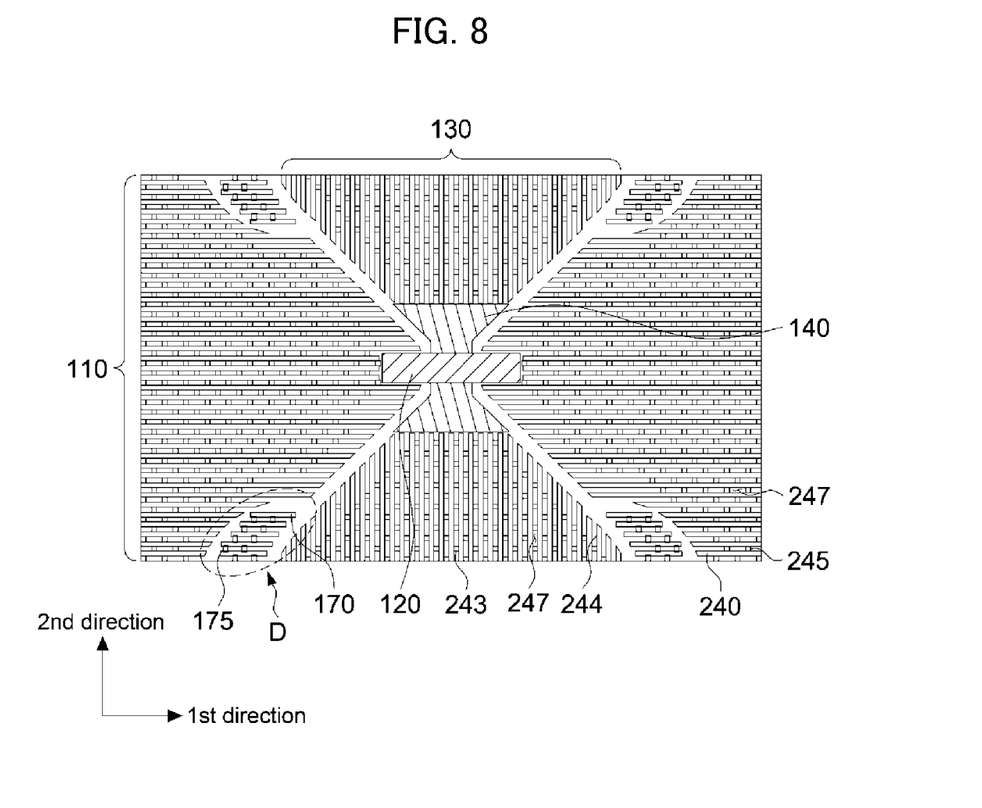
FIG. 8 is a schematic top plane view illustrating a construction of a sensing electrode and a dummy pattern in accordance with exemplary embodiments.

FIG. 8 is a schematic top plane view illustrating a construction of a sensing electrode and a dummy pattern in accordance with exemplary embodiments.

Referring to FIG. 8, electrode lines 240 and 244 in the sensing electrodes 110 and 130 may extend linearly.

For example, a first electrode line 240 included in the first sensing electrode 110 may extend linearly in the first direction. The neighboring first electrode lines 240 may be connected to each other by a first connecting block 245, and a slit 247 having a trench shape extending in the first direction may be defined.

A second electrode line 244 included in the second sensing electrode 130 may extend linearly in the second direction. The neighboring second electrode lines 244 may be connected to each other by a second connecting block 243, and a slit 247 having a trench shape extending in the second direction may be defined.

In some embodiments, as illustrated in FIG. 6, a boundary pattern confining each sensing electrodes 110 and 130 and merging the electrode lines 240 and 244 having the linear shape may be further formed.

As described above, dummy patterns 170 in the dummy region D may have a pattern period corresponding to that of the electrode lines 240 and 244, and may be arranged according to a profile of the electrode lines 240 and 244. For example, the dummy pattern 170 may have a bar pattern shape cut from the first electrode line 240.

According to exemplary embodiments, an image display device including the touch sensor is also provided.

For example, the touch sensor may be embedded between a window and a display panel of the image display device.

The display panel may include, e.g., a liquid crystal display (LCD) panel or an organic light emitting diode (OLED) panel. For example, the display panel may include a pixel circuit including a thin layer transistor (TFT) and a pixel portion connected to the pixel circuit. The pixel circuit may include electrodes and wirings such as a data line, a scan line, a driving line, etc., regularly arranged according to an arrangement of the pixel portion. The pixel portion may include a liquid crystal device or an OLED device, and may include a pixel electrode and an opposing electrode. The touch sensor may be disposed on the pixel portion.

According to exemplary embodiments as described above, the touch sensor may include the dummy patterns having a shape or a construction substantially the same as or similar to that of the electrode lines. An electrode visibility and a moire phenomenon due to a regular overlap with the electrodes and wirings may be effectively suppressed by the addition of the dummy patterns.

What is claimed is:

1. A touch sensor, comprising:
    a substrate layer;
    a plurality of sensing electrodes on the substrate layer, the plurality of sensing electrodes comprising electrode lines therein with a pattern period and slits therein, the plurality of sensing electrodes comprising first sensing electrodes arranged along a first direction that is parallel to a top surface of the substrate layer; and second sensing electrodes arranged along a second direction that is parallel to the top surface of the substrate layer and perpendicular to the first direction, the second sensing electrodes including the slits;
    bridge electrodes electrically connecting the first sensing electrodes neighboring each other;
    connecting portions integrally connected with the second sensing electrodes neighboring each other, the connecting portions disposed at the same level as a level of the second sensing electrodes to extend between second sensing electrodes neighboring in the second direction of the second sensing electrodes, the connecting portions having a solid structure devoid of slits and a mesh structure therein;
    dummy patterns disposed between the sensing electrodes by a pattern period corresponding to the pattern period of the electrode lines included in the sensing electrodes; and
    dummy blocks that connect the dummy patterns, each of the dummy blocks extending only between two neighboring dummy patterns of the dummy patterns,
    wherein the dummy patterns have inflected portions or bent portions, and the dummy blocks are connected with the inflected portions or the bent portions of the dummy pattern.

2. The touch sensor according to claim 1, wherein the electrode lines extend in a wavy line or a saw-tooth line.

3. The touch sensor according to claim 2, wherein the dummy patterns are arranged along an imaginary extension line extended from the wavy line or the saw-tooth line.

4. The touch sensor according to claim 1, wherein the dummy patterns include at least one of a wedge pattern, a line pattern or a bar pattern which is cut from the electrode line.

5. The touch sensor according to claim 1, wherein the sensing electrodes further include connecting blocks that connect neighboring electrode lines.

6. The touch sensor according to claim 5, wherein the slits are defined by the electrode lines and the connecting blocks neighboring each other.

7. The touch sensor according to claim 5, wherein the dummy blocks arranged by a pattern period that is the same as a pattern period of the connecting blocks.

8. The touch sensor according to claim 7, wherein dummy slits are defined by the dummy patterns and the dummy blocks neighboring each other.

9. The touch sensor according to claim 1, wherein dummy regions are defined between boundaries of the sensing electrodes which face each other; and
    the dummy patterns are arranged in each of the dummy regions.

10. The touch sensor according to claim 9, wherein the boundaries of the sensing electrodes extend in a wavy shape.

11. The touch sensor according to claim 1, wherein the electrode lines include:
    first electrode lines included in the first sensing electrode; and
    second electrode lines included in the second sensing electrode.

12. The touch sensor according to claim 11, wherein the first electrode lines extend in the first direction and the second electrode lines extend in the second direction.

13. An image display device including the touch sensor according to claim 1.

* * * * *